US008856960B2

(12) United States Patent
Puttaswamy Naga et al.

(10) Patent No.: US 8,856,960 B2
(45) Date of Patent: Oct. 7, 2014

(54) DATA LEAKAGE PREVENTION FOR CLOUD AND ENTERPRISE NETWORKS

(75) Inventors: Krishna P. Puttaswamy Naga, Metuchen, NJ (US); Fang Hao, Morganville, NJ (US); Muralidharan S. Kodialam, Marlboro, NJ (US); T.V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 227 days.

(21) Appl. No.: 13/369,475

(22) Filed: Feb. 9, 2012

(65) Prior Publication Data
US 2013/0212710 A1 Aug. 15, 2013

(51) Int. Cl.
*G06F 7/16* (2006.01)
*H04L 29/06* (2006.01)
(52) U.S. Cl.
USPC .............................. 726/30; 713/152
(58) Field of Classification Search
USPC ........... 726/1.25, 26, 30, 1, 25; 713/152, 164; 707/705, 821, 999.1; 709/202, 223
See application file for complete search history.

(56) References Cited

U.S. PATENT DOCUMENTS

| | | | |
|---|---|---|---|
| 6,044,488 A | 3/2000 | Liedtke | |
| 6,591,397 B1* | 7/2003 | Henriksen | 714/807 |
| 6,718,379 B1* | 4/2004 | Krishna et al. | 709/223 |
| 8,286,253 B1* | 10/2012 | Lu et al. | 726/26 |
| 8,458,796 B2* | 6/2013 | Stites et al. | 726/23 |
| 2002/0114356 A1* | 8/2002 | Morita et al. | 370/503 |
| 2002/0129140 A1 | 9/2002 | Peled et al. | |
| 2003/0105952 A1* | 6/2003 | Brabson et al. | 713/151 |
| 2005/0125684 A1* | 6/2005 | Schmidt | 713/200 |
| 2008/0307489 A1* | 12/2008 | Hubbard | 726/1 |
| 2009/0158430 A1 | 6/2009 | Borders | |
| 2009/0193256 A1* | 7/2009 | Takenaka et al. | 713/176 |
| 2009/0265558 A1 | 10/2009 | Izu et al. | |
| 2010/0254615 A1* | 10/2010 | Kantor et al. | 382/218 |
| 2011/0113249 A1 | 5/2011 | Gelbard et al. | |
| 2013/0097658 A1* | 4/2013 | Cooper et al. | 726/1 |

OTHER PUBLICATIONS

Rivest, R.Mit Laboratory for Computer Science,"The MD5 Message-Digest Algorithm", paper, Apr. 1992, pp. 1-21, Network Working Group Request for Comments: 1321.

* cited by examiner

*Primary Examiner* — Michael R Vaughan
*Assistant Examiner* — Abdullah Almamun
(74) *Attorney, Agent, or Firm* — Wolff & Samson, PC

(57) ABSTRACT

Apparatuses, methods and articles of manufacture for performing data leakage prevention are provided. Data leakage prevention may be performed by determining a signature of a transmitted document, the transmitted document being in transit to a location beyond a network boundary. The signature of the transmitted document is compared with one or more signatures of documents authorized to be transmitted beyond the network boundary. The transmitted document is prevented from being transmitted beyond the network boundary if the signature of the document does not correspond to a signature of a document authorized to be transmitted beyond the network boundary.

22 Claims, 5 Drawing Sheets

DATA LEAKAGE PREVENTION FOR CLOUD AND ENTERPRISE NETWORKS

TECHNICAL FIELD

The present disclosure is generally directed to network data security, and more specifically to preventing sensitive data from leaking out of a network at a network boundary.

BACKGROUND

The prospect of sensitive data being leaked outside of a network remains a fundamental security problem. Despite several technologies such as firewalls, intrusion detection systems and intrusion prevention systems designed to prevent unauthorized data from entering a network, data continues to regularly leak out of seemingly secure networks. For example, intrusions designed for disseminating sensitive data beyond a network boundary can occur due to "zero-day" attacks or security compromises at the application level. Sensitive data may also leak out of a network inadvertently, such as due to configuration errors or other mistakes made by humans having access to the sensitive data.

In one current method for data leakage prevention (DLP), keywords or regular expressions are installed via software at network boundaries to inspect outgoing documents (based on these keywords or regular expressions), and any documents that contain a match of these keywords or regular expressions can be prevented from leaving the network. This approach can have a high false-positive rate, however, as a significant number of non-sensitive documents can be flagged as sensitive. Thus, users may be wrongly prevented from communicating non-sensitive documents.

SUMMARY

Apparatuses, methods and articles of manufacture for data leakage prevention are proposed for identifying sensitive documents and preventing these documents from being communicated to a location beyond a network boundary, while limiting occurrences of false positives (i.e., the identification of non-sensitive documents as sensitive documents). Unique authorization signatures are generated for non-sensitive documents to separate sensitive data from non-sensitive data and to limit the probability of large-scale leakages. A data leakage controller can be implemented at network boundaries to inspect all outgoing documents.

In accordance with an embodiment, a signature for a transmitted document is determined, the transmitted document being in transit to a location beyond a network boundary. The signature for the transmitted document is compared with one or more signatures of documents authorized to be transmitted beyond the network boundary, and the transmitted document is prevented from being transmitted beyond the network boundary if signature of the transmitted document does not correspond to a signature of a document authorized to be transmitted beyond the network boundary. Preventing the transmitted document from being transmitted beyond the network boundary may include terminating a transmission control protocol-based connection associated with the transmitted document.

In accordance with an embodiment, a segment of the transmitted document is determined, and a signature corresponding to the segment of the transmitted document is determined. The segment of the transmitted document may be based on a byte length of the transmitted document.

In accordance with an embodiment, the signature corresponding to the segment of the transmitted document is compared with one or more signatures of documents authorized to be transmitted beyond the network boundary, and preventing the transmitted document from being transmitted beyond the network boundary includes preventing the transmission if the signature corresponding the segment of the transmitted document does not match a signature of a document authorized to be transmitted beyond the network boundary.

In accordance with an embodiment, a random number having a fixed number of bytes is generated. A byte value corresponding to a byte in a document authorized to be transmitted beyond a network boundary is determined. A position value corresponding to a position of the byte in the document is determined, and a logical function between the byte value, the position value and a byte of the random number corresponding to the position value is executed to generate a signature for the document. The logical function may comprise an exclusive-OR logical operator.

In accordance with an embodiment, a transmission control sequence number corresponding to a first byte of a transmitted document is received, a transmission control sequence number corresponding to a subsequent byte of a transmitted document is received, and a segment of the transmitted document is determined based on the received transmission control sequence numbers corresponding to the first and the subsequent bytes.

In accordance with an embodiment, a segment of a document authorized to be transmitted beyond the network boundary is determined, and a logical function is executed between the byte value, the position value and a byte of the random number corresponding to the position of the byte to generate a signature for one or more bytes in a segment of the document. The segment may be determined based on a byte length of the document.

These and other advantages of the invention will be apparent to those of ordinary skill in the art by reference to the following detailed description and the accompanying drawings.

DETAILED DESCRIPTION

The embodiments disclosed herein include generating authorization signatures that uniquely identify documents that are authorized to be transmitted beyond a network boundary (non-sensitive documents) while limiting occurrences of false-positive identifications (i.e., identifying sensitive documents that are not authorized to be transmitted beyond a network boundary as non-sensitive documents, and vice versa). The embodiments can be implemented at network boundaries, such as via a controller, and are generally resilient to packet loss, reordering, and retransmissions of documents.

Figure 1:
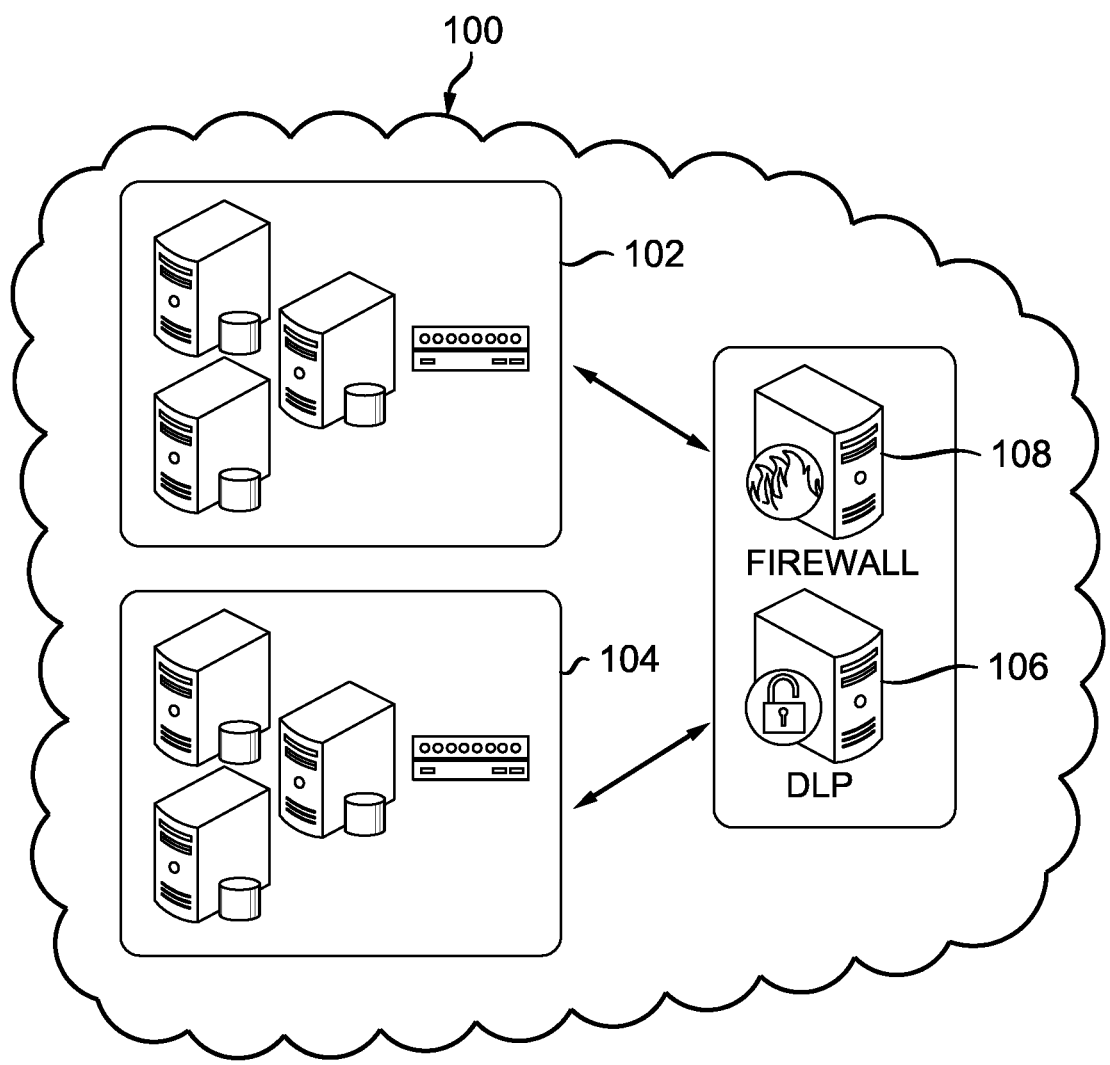
FIG. 1 is a diagram showing an exemplary location of a data leakage prevention controller relative to a network boundary in accordance with an embodiment.

Data leakage prevention, as described herein, can be provided in a variety of forms. FIG. 1 illustrates an exemplary environment 100 in which various exemplary embodiments of data leakage prevention can be provided.

In one exemplary embodiment, FIG. 1 is a diagram showing a location of a data leakage prevention controller relative to a network boundary in accordance with an embodiment. For example, in environment 100, documents may be transmitted between networks, such as between network 102 and network 104. In one configuration, data leakage prevention controller 106 can be located proximate to firewall 108 at a network boundary (i.e., a border separating intra-network nodes from nodes located outside of a network), such that data leakage prevention controller 106 is positioned to prevent sensitive documents from being transmitted between network 102 and network 104. In other embodiments, data leakage prevention controller 106 may be combined with firewall 108 in a device or, alternatively, be located remote from (i.e., not proximate to) firewall 108. One or more functions of data leakage controller 106 also may be distributed among devices at several physical locations that may be proximate, or not proximate, to a firewall. As described in detail below, in exemplary embodiments data leakage prevention controller 106 also may include any combination of hardware and/or software instructions for generating signatures for documents that are authorized to be transmitted to a location beyond a network boundary, and for implementing steps to provide data leakage control for transmitted documents based on the generated signatures at a boundary of a network.

Figure 2:
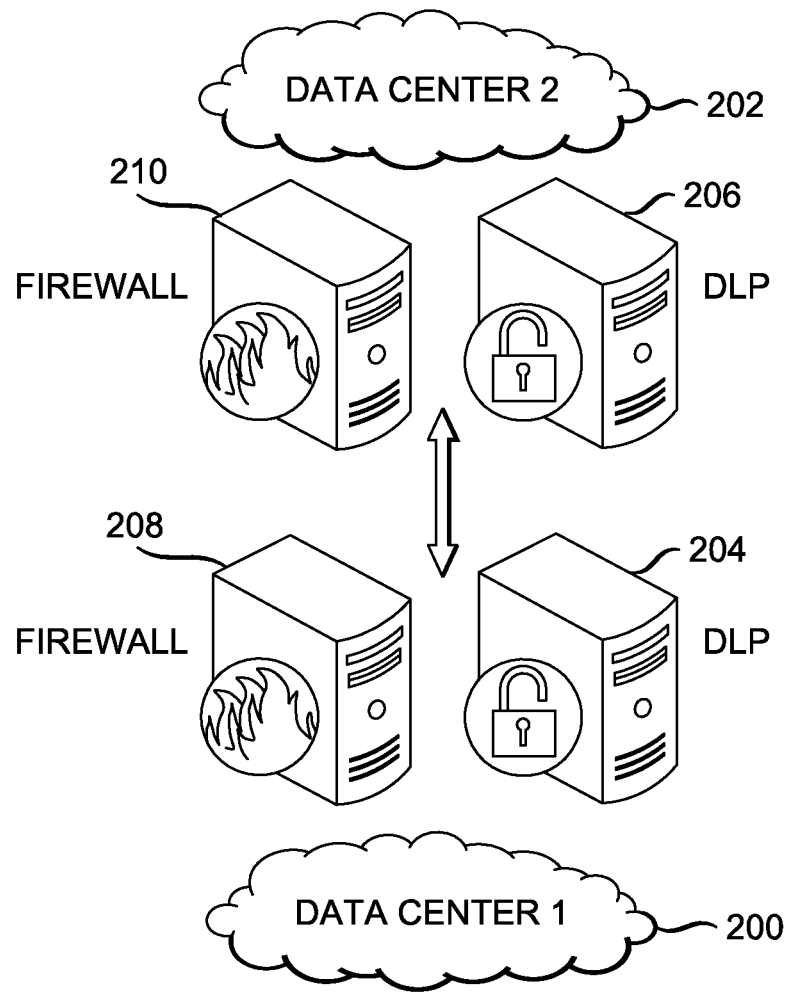
FIG. 2 is a diagram showing another exemplary location of a data leakage prevention controller relative to data center borders in accordance with an embodiment.

FIG. 2 is a diagram showing another exemplary location of a data leakage prevention controller relative to data center borders in accordance with an embodiment. For example, it may be desirable to prevent data leakage for documents that are communicated between data centers, such as data center 1 200 and data center 2 202. In this configuration, data leakage prevention controllers 204 and 206 can be located proximate to firewalls 208 and 210, respectively, which may be located at a border of each data center.

One skilled in the art will recognize that the configurations illustrated in FIGS. 1 and 2, while exemplary, are merely examples of placement configurations for one or more data leakage prevention controllers at one or more network boundaries. As such, one skilled in the art also will recognize that several alternative network configurations are possible for implementing the embodiments described herein. As described above, one or more data leakage prevention controllers may be combined with a firewall in a device or, alternatively, be located remote from a firewall. Also, one or more functions of a data leakage controller may be distributed among devices at several physical locations that may be proximate, or not proximate, to a firewall.

A signature of a document that is authorized to be transmitted beyond a network boundary (also referred to herein as an authorization signature) can be constructed as a unique identifier of a document or document segment. An authorization signature also can be constructed to be electronically processed (e.g., within a commercially practical amount of time by a data leakage prevention controller) such that a transmitted sensitive document in transit to a location beyond a network boundary can be prevented from being transmitted beyond the network boundary (e.g., when the authorization signature for the transmitted sensitive document does not correspond to a signature of a document authorized to be transmitted beyond the network boundary).

In one embodiment, an authorization signature may include a fixed number of bytes (e.g., selected based on processing considerations). For example, generating a unique authorization signature may include encoding the bytes of a document authorized to be transmitted beyond a network boundary with randomly chosen numbers having a fixed byte length. In particular, a byte of a non-sensitive document may be encoded by executing a logical operation (e.g., an exclusive-OR logical operation) between the byte value, a value indicating the position of the byte within the document (i.e., the position value) and a randomly chosen number. The resulting authorization signature for the byte can then be stored within an authorization signature dataset, such as within a database of network 102 or network 104 in FIG. 1.

In another embodiment, one or more memory captures (also referred to herein as snapshots) can be taken of the signature values that are generated at different byte positions within a document. These one or more snapshots can be taken as the signatures of each byte of a non-sensitive document are being generated. For example, snapshots can be taken for every 100 byte, 200 byte, etc. segment of a document until the end of the document (i.e., until there are no more bytes to divide into segments), such that the signatures for each byte of a segment collectively comprise the signature for the segment. One or more Bloom filters (data structures for testing whether an element is a member of a set) can then be configured to capture every such snapshot position across all the documents of a non-sensitive document dataset, such that the bloom filters may comprise an authorization signature database for each segment (or selected segments) of all of the documents in the non-sensitive document dataset.

As such, before data leakage prevention can be applied to a transmitted document, an authorization signature dataset based on the signatures of documents or document segments that are authorized to be transmitted to a location beyond a network boundary must be generated.

Figure 3:
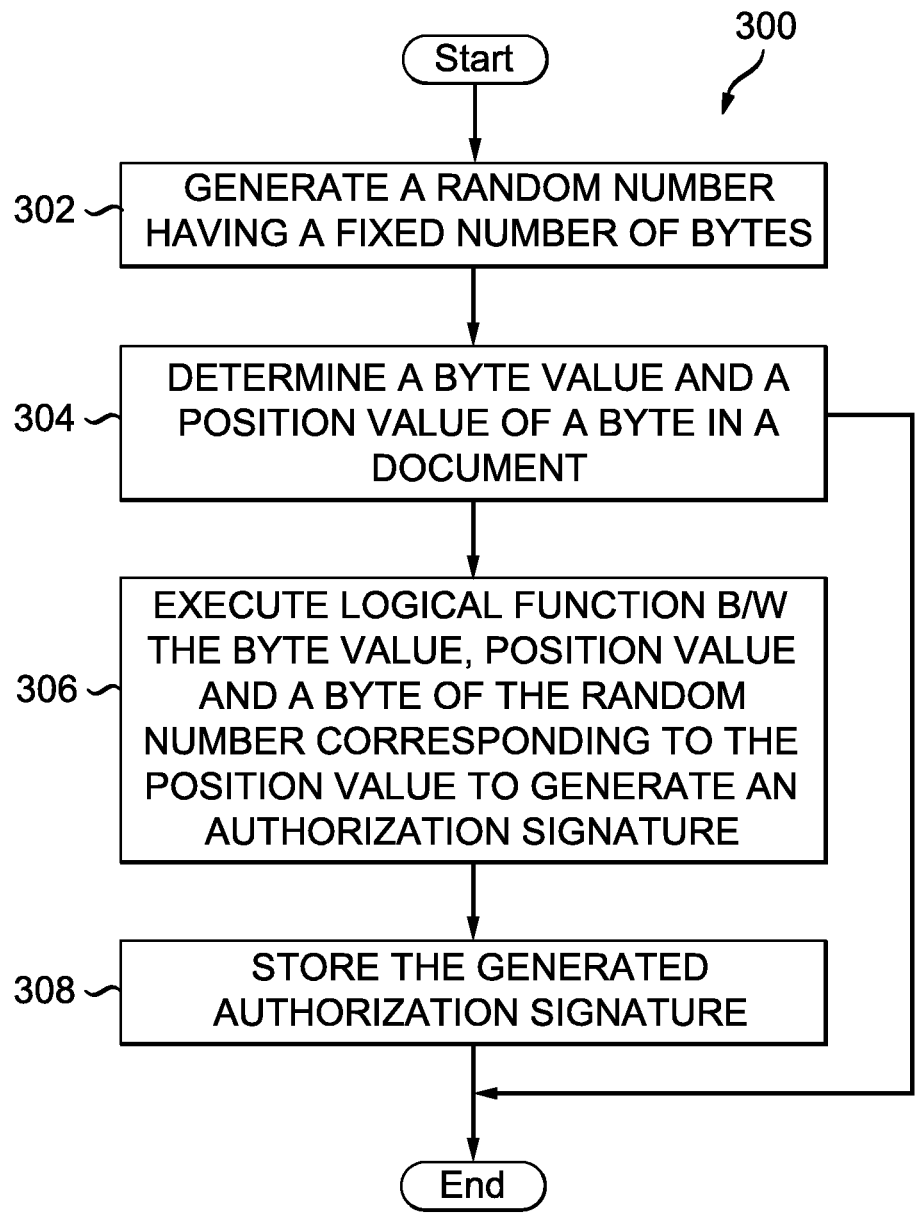
FIG. 3 is a flowchart of a process for generating a signature dataset for documents authorized to be transmitted beyond a network boundary in accordance with an embodiment.

FIG. 3 is a flowchart of a process for generating a signature dataset for documents authorized to be transmitted beyond a network boundary in accordance with an embodiment. Referring to flowchart 300, generating an authorization signature for a non-sensitive document initially includes generating a random number having a fixed number of bytes at step 302. The random number may be selected or randomly generated. The random number can be any number of bytes in length based on various design considerations. For example, a relatively short random number (i.e., a fewer number of bytes) may be selected to increase processing speeds for generating or determining signatures derived from the random number. Alternatively, a relatively long random number (i.e., a greater number of bytes) may be selected to increase the accuracy of generated signatures (e.g., to lower the possibility of false positives). In one embodiment, an 8-byte random number, denoted herein as FPT[0:7], may be selected or generated as a seed for generating signatures based on each byte of one or more documents of a dataset.

At step 304, a byte value corresponding to a byte within a document authorized to be transmitted beyond a network boundary, and a position value corresponding to a position of the byte within the document are determined. For example, a position value, pos, of a byte within a document is typically represented by a numerical string that can be several bytes in length.

Once a byte value and position value of a byte are known, the random number generated at step 302 may be utilized to generate a signature for the byte by executing a logical function. At step 306, a logical function is executed between the byte value, the position value, pos, and a byte of the random number corresponding to the position of the byte to generate an authorization signature for the byte. For example, the logical function for generating the authorization signature can be expressed as:

$$FPT[pos\%8]=FPT[pos\%8] \hat{} \, b \hat{} \, pos$$

wherein b is the byte value, pos is the position value, FPT [pos%8] is the byte of the random number corresponding to the byte position (e.g., FPT[0] for the first byte of the document, FPT[1] for the second byte, etc.) and the logical operator (^) is an exclusive-OR (XOR) logical operator. The generated authorization signature for the byte is stored at step 308.

The process illustrated in FIG. 3 can loop and repeat steps 304-308 for a next byte of the document until a signature is generated and stored for each byte of the document. For example, when an 8-byte random number is utilized, the first random number byte, FPT[0], is utilized to generate a signature for the byte at position 1, and then for the bytes at positions 9 and 17 (i.e., every eighth byte of the document). The second random number byte, FPT[1], is utilized to generate a signature for the byte at position 2, and then the bytes at positions 10, 18. The third random number byte, FPT[2], is utilized to generate a signature for the byte at position 3, and then the bytes at positions 11, 19, and so forth until the end of the document.

Once an authorization signature dataset is generated and stored for each byte of a document, the flow of transmitted documents out of a network (e.g., transmitted documents in transit to a location beyond a network boundary) can be monitored and controlled. In one embodiment, a signature of a transmitted document (or section of a transmitted document) can be computed based on the process described in FIG. 3 for every TCP-based connection at a network boundary. For example, at every document segment (i.e., snapshot location), a signature of each transmitted document segment (i.e., the collective signatures of all of the bytes within the segment) may be computed based on the logical function described in FIG. 3 and compared to signatures stored in the authorization signature dataset. The transmitted document can then be prevented from being transmitted beyond the network boundary if the signature(s) of the transmitted document are not in the authorization signature dataset. For example, a transmitted document can be prevented from being transmitted beyond the network boundary by terminating a TCP-based connection associated with the transmitted document.

Figure 4:
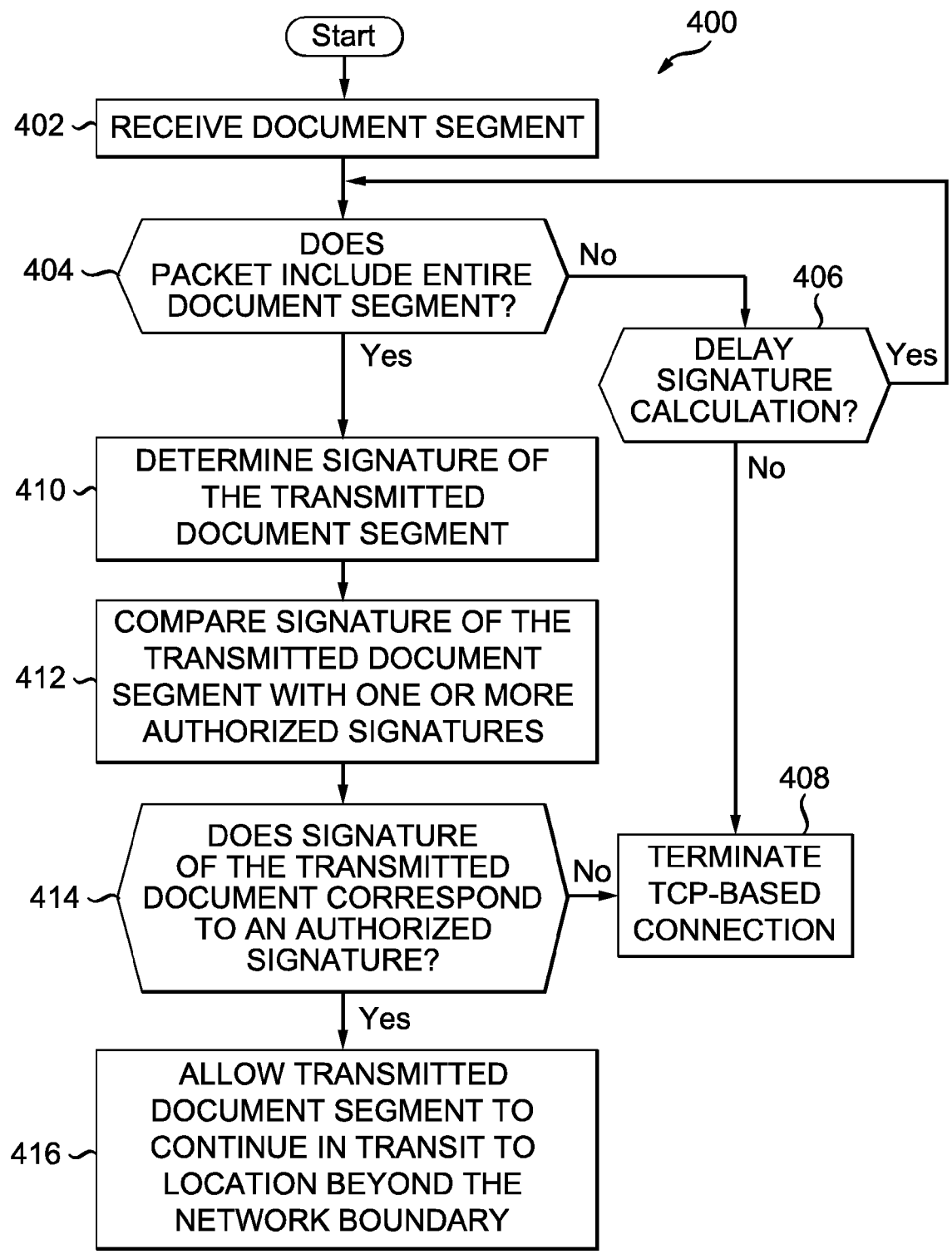
FIG. 4 is a flowchart of a process applying data leakage prevention for a transmitted document segment in transit to a location beyond a network boundary in accordance with an embodiment.

FIG. 4 is a flowchart of a process for applying data leakage prevention to a transmitted document in transit to a location beyond a network boundary in accordance with an embodiment. Referring to flowchart 400, a packet including, for example, one or more bytes of a transmitted document, a segment of a transmitted document or an entire transmitted document, is received at step 402. For example, the packet may be received at data leakage prevention controller 106, while in transit between components of a network, such as between components of network 102 and network 104 in FIG. 1.

At step 404, it is determined whether the packet includes an entire document or document segment. For various reasons, a document may be transmitted via a TCP-based connection out of sequence. In particular, the sequence of transmitted packets containing the document may vary from the sequence of the bytes within the document. However, each byte of a segment may be needed to compute an accurate signature. For example, if the first received packet includes a sequence number for byte 90 of the transmitted document, and the second received packet includes a sequence number for byte 10 of the transmitted document, and snapshots have been saved for each 100 byte segment of authorized documents, an appropriate snapshot for evaluating the transmitted document segment may include the collective signatures for bytes 0-99 (i.e., the first 100 bytes of the transmitted document). As such, at step 404 a subtraction operation may be performed between a sequence number of a first received packet in the TCP connection and a sequence number of a currently received packet to determine a segment of the transmitted document corresponding to the transmitted packets. The received packets may then be checked to determine if all of the bytes for the segment have been received. If it is determined that all of the bytes of a segment (or document) have not been received, the signature calculation is delayed for a predetermined amount of time at step 406 and, after the delay, the process may return to step 404. If all of the bytes of the segment are not received within the predetermined amount of time at step 406, the signature calculation may be delayed again or a TCP-based connection associated with the transmitted document may be terminated at step 408.

Following the alternative path at step 404, if all of the bytes of the document segment (e.g., bytes 0 to 99) have been received within the predetermined time, the signature of the transmitted document segment (e.g., the collective of the signatures for each byte of the segment) is determined at step 408 based on the logical function described with respect to FIG. 3. For example, a byte value, position value and a byte of the random number corresponding to the byte position may be used to compute an authorization signature for each byte of a transmitted document or document segment, or for selected bytes of a transmitted document segment.

At step 412, the signature of the transmitted document or document segment is compared with one or more authorized signatures (i.e., signatures of documents authorized to be transmitted beyond the network boundary, such as those generated by the process illustrated in FIG. 3). For example, one or more Bloom filters or other data structures for testing whether an element is a member of a set can be configured to evaluate the signature of the transmitted document at one or more snapshot positions to determine if the signature is within an authorized signature dataset.

If at step 414, the signature of the transmitted document or segment does not correspond to an authorized signature, the transmitted document is prevented from being transmitted beyond the network boundary at step 408 (e.g., a TCP-based connection associated with the transmitted document may be terminated). Otherwise, if the signature of the transmitted document or segment does correspond to a signature of a document authorized to be transmitted beyond the network boundary at step 414, the transmitted document is allowed to continue in transit to a location beyond the network boundary at step 416, such as via the TCP-based connection.

If packets containing additional segments of the transmitted document are received, the process returns to step 402 and repeats until the next transmitted document segment is allowed to continue in transit beyond the network boundary at step 416, or until the transmission is terminated at step 408.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 3 and/or 4. Certain steps of the methods described herein, including one or more of the steps of FIGS. 3 and/or 4, may be performed by a server or by another processor in a network-based cloud-computing system. Certain steps of the methods described herein, including one or more of the steps of FIGS. 3 and/or 4, may be performed by a client computer in a network-based cloud computing system. The steps of the methods described herein, including one or more of the steps of FIGS. 3 and/or 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3 and/or 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
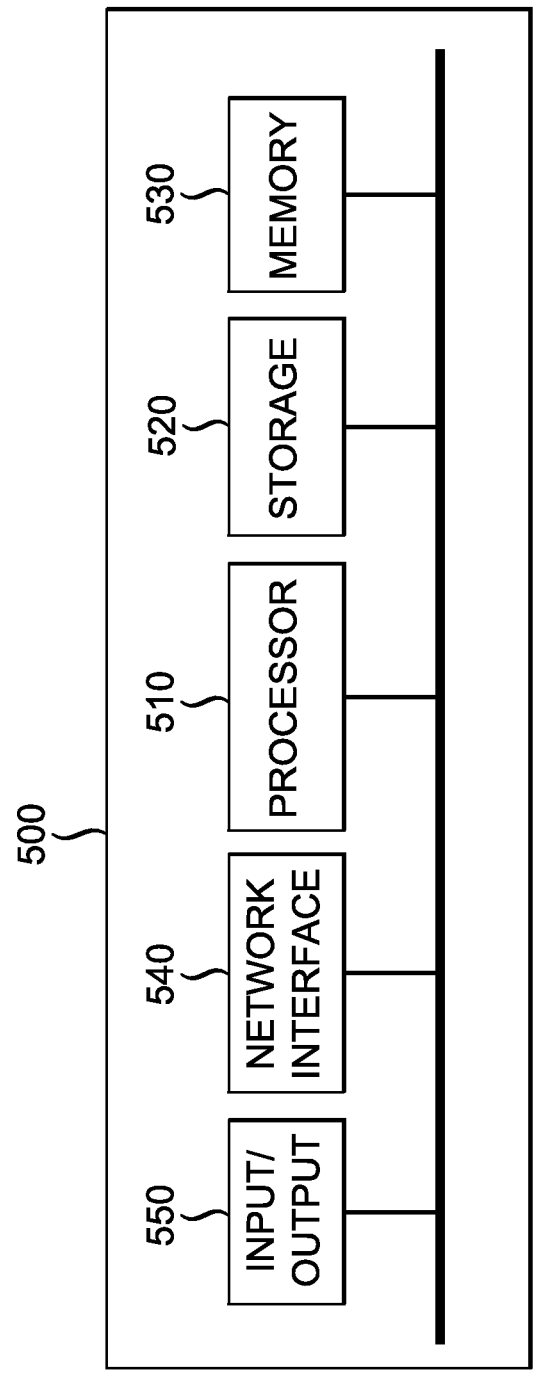
FIG. 5 is a high-level block diagram of an exemplary computer that may be used for implementing a data leakage prevention controller.

A high-level block diagram of an exemplary computer that may be used to implement systems, apparatus and methods described herein is illustrated in FIG. 5. Computer 500 comprises a processor 510 operatively coupled to a data storage device 520 and a memory 530. Processor 510 controls the overall operation of computer 500 by executing computer program instructions that define such operations. The computer program instructions may be stored in data storage device 520, or other computer readable medium, and loaded into memory 530 when execution of the computer program instructions is desired. Thus, the method steps of FIGS. 3 and/or 4 can be defined by the computer program instructions stored in memory 530 and/or data storage device 520 and controlled by processor 510 executing the computer program instructions. For example, the computer program instructions can be implemented as computer executable code programmed by one skilled in the art to perform an algorithm defined by the method steps of FIGS. 3 and/or 4. Accordingly, by executing the computer program instructions, the processor 510 executes an algorithm defined by the method steps of FIGS. 3 and/or 4. Computer 500 also includes one or more network interfaces 540 for communicating with other devices via a network. Computer 500 also includes one or more input/output devices 550 that enable user interaction with computer 500 (e.g., display, keyboard, mouse, speakers, buttons, etc.).

Processor 510 may include both general and special purpose microprocessors, and may be the sole processor or one of multiple processors of computer 500. Processor 510 may comprise one or more central processing units (CPUs), for example. Processor 510, data storage device 520, and/or memory 530 may include, be supplemented by, or incorporated in, one or more application-specific integrated circuits (ASICs) and/or one or more field programmable gate arrays (FPGAs).

Data storage device 520 and memory 530 each comprise a tangible non-transitory computer readable storage medium. Data storage device 520, and memory 530, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 550 may include peripherals, such as a printer, scanner, display screen, etc. For example, input/output devices 550 may include a display device such as a cathode ray tube (CRT), plasma or liquid crystal display (LCD) monitor for displaying information to the user, a keyboard, and a pointing device such as a mouse or a trackball by which the user can provide input to computer 500.

Any or all of the systems and apparatus discussed herein, including data leakage prevention controllers 106, 204 and 206, may be implemented using a computer such as computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

We claim:

1. An apparatus comprising:
   a data storage device; and
   a processor communicatively coupled to the data storage device, the processor in cooperation with the data storage device configured to:
   determine a signature of a transmitted document based on a logical function, a byte value, a position value and a byte of a random number, the transmitted document being in transit to a location beyond a network boundary;
   determine a subset of one or more signatures of documents authorized to be transmitted beyond the network boundary, the subset corresponding to the position value of the transmitted document;
   compare the signature of the document with the subset of one or more signatures; and
   prevent the transmitted document from being transmitted beyond the network boundary if the signature of the transmitted document does not correspond to a signature of a document authorized to be transmitted beyond the network boundary.

2. The apparatus of claim 1, wherein preventing the transmitted document from being transmitted beyond the network boundary includes terminating a transmission control protocol-based connection associated with the transmitted document.

3. The apparatus of claim 1, wherein the processor is further configured to:
   determine a segment of the transmitted document; and
   determine a signature corresponding to the segment of the transmitted document.

4. The apparatus of claim 3, wherein the processor is further configured to:
   receive a transmission control sequence number corresponding to a first byte of a transmitted document;
   receive a transmission control sequence number corresponding to a subsequent byte of a transmitted document; and
   determine the segment of the transmitted document based on the received transmission control sequence numbers corresponding to the first and the subsequent bytes.

5. The apparatus of claim 3, wherein:
   comparing the signature includes comparing the signature corresponding to the segment of the transmitted document with one or more signatures of documents authorized to be transmitted beyond the network boundary; and
   preventing the transmitted document from being transmitted beyond the network boundary includes preventing the transmission if the signature corresponding to the segment of the transmitted document does not correspond to a signature of a document authorized to be transmitted beyond the network boundary.

6. The apparatus of claim 1,
   wherein the processor is further configured to:
   generate a random number having a fixed number of bytes;
   determine a byte value corresponding to a byte in a document authorized to be transmitted beyond a network boundary;
   determine a position value corresponding to a position of the byte in the document; and
   execute a logical function between the byte value, the position value and a byte of the random number corresponding to the position value to generate a signature for the document.

7. The apparatus of claim 6, wherein the logical function comprises an exclusive-OR logical operator.

8. The apparatus of claim 6, wherein determining a position of a byte includes determining a transmission control protocol sequence number corresponding to the byte.

9. The apparatus of claim 6, wherein the processor is further configured to:
   select one or more segments of the document authorized to be transmitted beyond the network boundary, wherein executing the logical function between the byte value, position value and the byte of the random number generates a signature for one or more bytes in a segment of the document.

10. The apparatus of claim 9, wherein the one or more segments are selected based on a byte length of the document.

11. A non-transitory computer-readable medium having computer program instructions stored thereon, which, when executed on a processor, cause the processor to perform a method comprising:
    determining a signature of a transmitted document based on a logical function, a byte value, a position value and a byte of a random number, the transmitted document being in transit to a location beyond a network boundary;
    determining a subset of one or more signatures of documents authorized to be transmitted beyond the network boundary, the subset corresponding to the position value of the transmitted document;
    comparing the signature of the document with the subset of one or more signatures; and
    preventing the transmitted document from being transmitted beyond the network boundary if the signature of the transmitted document does not correspond to a signature of a document authorized to be transmitted beyond the network boundary.

12. The non-transitory computer-readable medium of claim 11, wherein preventing the transmitted document from being transmitted beyond the network boundary includes terminating a transmission control protocol-based connection associated with the transmitted document.

13. The non-transitory computer-readable medium of claim 11, wherein the method further comprises:
    determining a segment of the transmitted document; and
    determining a signature corresponding to the segment of the transmitted document.

14. The non-transitory computer-readable medium of claim 13, wherein the method further comprises:
    receiving a transmission control sequence number corresponding to a first byte of a transmitted document;
    receiving a transmission control sequence number corresponding to a subsequent byte of a transmitted document; and
    determining the segment of the transmitted document based on the received transmission control sequence numbers corresponding to the first and the subsequent bytes.

15. The non-transitory computer-readable medium of claim 13, wherein:
    comparing the signature includes comparing the signature corresponding to the segment of the transmitted document with one or more signatures of documents authorized to be transmitted beyond the network boundary; and preventing the transmitted document from being transmitted beyond the network boundary includes preventing the transmission if the signature corresponding to the segment of the transmitted document does not correspond to a signature of a document authorized to be transmitted beyond the network boundary.

16. The non-transitory computer-readable medium of claim 11, wherein the method further comprises
generating a random number having a fixed number of bytes;
determining a byte value corresponding to a byte in a document authorized to be transmitted beyond a network boundary;
determining a position value corresponding to a position of the byte in the document; and
executing a logical function between the byte value, the position value and a byte of the random number corresponding to the position value to generate a signature for the document.

17. The non-transitory computer-readable medium of claim 16, wherein the logical function comprises an exclusive-OR logical operator.

18. The non-transitory computer-readable medium of claim 16, wherein determining a position of a byte includes determining a transmission control protocol sequence number corresponding to the byte.

19. The non-transitory computer-readable medium of claim 16, the method further comprising selecting one or more segments of the document authorized to be transmitted beyond the network boundary, wherein executing the logical function between the byte value, position value and the byte of the random number generates a signature for one or more bytes in a segment of the document.

20. The non-transitory computer-readable medium of claim 19, wherein the one or more segments are selected based on a byte length of the document.

21. A method comprising:
at a processor communicatively coupled to a data storage device, determining a signature of a transmitted document based on a logical function, a byte value, a position value and a byte of a random number, the transmitted document being in transit to a location beyond a network boundary;
determining a subset of one or more signatures of documents authorized to be transmitted beyond the network boundary, the subset corresponding to the position value of the transmitted document;
comparing, by the processor in cooperation with the data storage device, the signature of the transmitted document with the subset of one or more signatures; and
preventing, by the processor in cooperation with the data storage device, the transmitted document from being transmitted beyond the network boundary if the signature of the transmitted document does not correspond to a signature of a document authorized to be transmitted beyond the network boundary.

22. The method of claim 21, further comprising:
at the processor communicatively coupled to the data storage device, generating a random number having a fixed number of bytes;
determining, by the processor in cooperation with the data storage device, a byte value corresponding to a byte in a document authorized to be transmitted beyond a network boundary;
determining, by the processor in cooperation with the data storage device, a position value corresponding to a position of the byte in the document; and executing, by the processor in cooperation with the data storage device, a logical function between the byte value, the position value and a byte of the random number corresponding to the position value to generate a signature for the document.

* * * * *